United States Patent Office 3,459,568
Patented Aug. 5, 1969

3,459,568
HIGH STRENGTH FIBER GLASS
Dale W. Rinehart, Natrona Heights, Pa., assignor to PPG Industries, Inc., Pittsburgh, Pa., a corporation of Pennsylvania
No Drawing. Filed June 22, 1965, Ser. No. 466,058
Int. Cl. C03c 13/00
U.S. Cl. 106—52            2 Claims

ABSTRACT OF THE DISCLOSURE

The instant invention relates to a novel glass composition exhibiting high strength in fibrous form. More particularly, the present invention relates to fibers of a magnesia-titania-alumina-silica glass having high tensile strength and high modulus of elasticity. The invention especially pertains to glass fibers of the following composition.

| Component: | Percent by weight |
|---|---|
| $SiO_2$ | 54–62 |
| $Al_2O_3$ | 20–27 |
| MgO | 5–11 |
| $TiO_2$ | 2–10 |
| $Li_2O$ | 0–2 |

A typical commercial fiber glass composition known as the "E" Composition is presented below.

| Component: | Percent by weight |
|---|---|
| $SiO_2$ | 54.4 |
| $Al_2O_3$ | 13.4 |
| CaO | 21.7 |
| MgO | 0.4 |
| $B_2O_3$ | 8.5 |
| $F_2$ | 0.5 |
| $Na_2O$ | 0.7 |
| $TiO_2$ | 0.5 |
| $Fe_2O_3$ | 0.2 |

This glass composition requires a fiber forming temperature of about 2400° F. The tensile strength exhibited by Composition E glass fibers is typical of the commonly used commercial fiber glass compositions and is between 400,000 and 500,000 pounds per square inch for fibers measuring from $25 \times 10^{-5}$ inches to $70 \times 10^{-5}$ inches in diameter.

Various uncommon glass compositions exhibiting high tensile strengths in fibrous form are also known. One such glass composition is a magnesia-alumina-silica glass composition consisting of approximately 65 percent $SiO_2$, 25 percent $Al_2O_3$, and 10 percent MgO. This composition exhibits a tensile strength in fibrous form of about 637,000 pounds per square inch for fibers measuring from $60 \times 10^{-5}$ inches to $64 \times 10^{-5}$ inches in diameter. The liquidus temperature of this glass composition is between 2630 and 2650° F. which considerably shortens the life of the bushing used to form the fibers. This magnesia-alumina-silica composition will hereinafter be referred to as the "A" glass composition.

What has been discovered in the present invention is a family of new glass compositions exhibiting high fibrous tensile strength and high modulus of elasticity. The glass compositional family of the present invention is defined by the following percent by weight ranges for the ingredients indicated.

| Component: | Percent by weight |
|---|---|
| $SiO_2$ | 54–62 |
| $Al_2O_3$ | 20–27 |
| MgO | 5–11 |
| $TiO_2$ | 2–10 |
| $Li_2O$ | 0–2 |

The preferred ranges of these ingredients are presented below.

| Component: | Percent by weight |
|---|---|
| $SiO_2$ | 56–59 |
| $Al_2O_3$ | 24–26 |
| MgO | 5–11 |
| $TiO_2$ | 7–10 |
| $Li_2O$ | 0–2 |

The preferred composition of the present invention is presented below.

COMPOSITION "I"

| Component: | Percent by weight |
|---|---|
| $SiO_2$ | 56.90 |
| $Al_2O_3$ | 24.60 |
| MgO | 9.8 |
| $TiO_2$ | 8.7 |

This preferred composition has been found to exhibit an average tensile strength in fibrous form of 677,000 pounds per square inch for filaments measuring between $47 \times 10^{-5}$ inches and $75 \times 10^{-5}$ inches in diameter. The measured liquidus temperature of preferred Composition "I" is somewhat higher than that of Composition "A" but composition "I" is somewhat higher than that of Composition "A" but Composition "I" has been found to be formable into fibers at temperatures between 100 and 150° F. lower than the "A" composition.

The present invention will be more readily understood by making reference to the following detailed examples:

Example I is the preferred embodiment of the present invention and represents the best mode contemplated by the inventor for practicing the teachings of his invention.

EXAMPLE I

The following raw batch materials were weighed out in the amounts indicated to formulate preferred Composition "I."

| Raw batch materials: | Weight in grams |
|---|---|
| $SiO_2$ (agate sand 99.78% silicon dioxide) | 329.40 |
| $Al(OH)_3$ (reagent grade 99.8% aluminum hydroxide) | 228.48 |
| $MgCO_3$ (Mallinckrodt 87.03% magnesium carbonate) | 141.30 |
| $TiO_2$ (reagent grade 99.9% titanium dioxide) | 55.20 |

The raw batch materials were placed in a one half gallon jar and thoroughly mixed by rotating the jar on a ball mill for 30 minutes at approximately 100 rotations per minute. After mixing, the batch was transferred to a four inch diameter clay crucible and placed in a furnace. The batch was heated to a temperature of about 2750° F. for a period of 90 minutes. The crucible was then removed from the furnace and the molten glass quenched to form cullet by pouring the molten glass into cold water contained in a stainless steel bucket. The surplus water was then poured off the quenched cullet and the cullet dried by placing it on top of a melting furnace for a period of 30 minutes. The dried cullet was then replaced in the clay crucible and remelted in the furnace at at temperature of about 2750° F. for 45 minutes. This heating-quenching cycle was repeated three times to insure that adequate homogenization of the glass was achieved.

After the third cold water quench and reheat, the molten glass at a temperature of about 2750° F. was removed from the furnace and poured onto a steel plate to produce a glass patty approximately ¼ inch thick by 4 inches in diameter. The glass patty was then placed in a furnace preheated to about 1500° F. The power to the furnace was then turned off and the furnace was slowly allowed to cool to room temperature over a period of about 18 hours to anneal the glass. The annealed glass patty was then removed from the annealing furnace and cut into chunks approximately ½ inch square by about ¼ inch thick.

Chucks of the Composition "I" patty were then placed in a single orifice, 80 percent platinum-20 percent rhodium bushing by heating the bushing to about 2700° F. A single filament was then drawn from the bushing at a rate of about 5,000 feet per minute having a diameter of approximately $50 \times 10^{-5}$ inches.

The single orifice platium-rhodium bushing used in fabricating the fiber was 3 inches long by 1 inch wide. The bushing was provided with a 1½ inch diameter flange at its top. The bushing's single orifice was .070 inch in inside diameter, .120 inch long and had an exit outside diameter of under 0.95 inch.

After the glass fiber had been drawn, it was cut into test samples approximately 1 inch long. The fiber diameters and moduli of elasticity were then measured. The samples were then tension loaded in a monofilament testing machine to determine their tensile breaking strength. The tensile strength, in pounds per square inch for each sample was then calculated by dividing the breaking load in pounds by the cross sectional area of the fiber in square inches.

Table I presents the tensile strength data and the modulus of elasticity determined for three glass compositions. In addition to Composition "I," fibers of Compositions "A" and "E" having comparable size diameters were similarly prepared and tested to compare their tensile strength and modulus of elasticity.

TABLE I

| Composition | Average diameter in inches | No. of tests | Tensile strength (p.s.i.) | Modulus of elasticity (p.s.i.) |
|---|---|---|---|---|
| "E" | $46 \times 10^{-5}$ | 10 | 474,000 | $10.5 \times 10^6$ |
| "A" | $62 \times 10^{-5}$ | 20 | 637,000 | $12 \times 10^6$ |
| "I" | $61 \times 10^{-5}$ | 25 | 677,000 | $15 \times 10^6$ |

Table II presents other properties of these three glass compositions which are significant in determining their fiber forming and melting characteristics.

TABLE II

| Glass composition | Liquidus temperature (° F.) | Strain point (° F.) | Annealing point (° F.) |
|---|---|---|---|
| "E" | 2,030 | 1,180 | 1,240 |
| "A" | 2,630–2,650 | 1,403 | 1,488 |
| "I" | 2,676–2,693 | 1,330 | 1,412 |

Although the liquidus temperature of the "A" composition is lower than the liquidus temperature of the Composition "I," it has been found that the Composition "I" forming temperature is between 100 and 150° F. lower than the forming temperature of the "A" composition.

EXAMPLE II

The following raw batch materials were weighed out in the amounts indicated to formulate Composition "II."

Composition "II" batch

Raw batch materials: Weight in grams
- $SiO_2$ (agate sand 99.78% silicon dioxide) --- 169.4
- $Al(OH)_3$ (reagent grade 99.8% aluminum hydroxide) --- 113.5
- $MgCO_3$ (Mallinckrodt 87.03% magnesium carbonate) --- 60.2
- $TiO_2$ (reagent grade 99.9% titanium dioxide) 26.0
- $Li_2CO_3$ (reagent grade 99% lithium carbonate) --- 3.5

These batch materials were mixed, melted and homogenized in accordance with the procedure described in Example I. The procedure for preparing the glass patty chunks and the drawing of the single fiber was also the same as that employed in Example I.

The calculated chemical composition of glass "II" is presented below.

Composition "II"

Component: Percent by weight
- $SiO_2$ --- 57.39
- $Al_2O_3$ --- 24.84
- $MgO$ --- 8.49
- $TiO_2$ --- 8.81
- $Li_2O$ --- .47

The test filaments of Composition "II" were found to exhibit a tensile strength between 614,000 and 740,000 pounds per square inch for fiber measuring between $19.5 \times 10^{-5}$ inches and $57.5 \times 10^{-5}$ inches in diameter. The modulus of elasticity for Composition "II" fiber is about $13.3 \times 10^6$ p.s.i. The liquidus temperature, strain point and annealing point for Composition "II" are approximately 2600° F., 1290° F., and 1365° F., respectively.

EXAMPLE III

The following raw batch materials were weighed out in the amounts indicated to formulate Composition "III."

Composition "III" batch

Raw batch materials: Weight in grams
- $SiO_2$ (agate sand 99.78% silicon dioxide) --- 172.3
- $Al(OH)_3$ (reagent grade 99.8% aluminum hydroxide) --- 114.2
- $MgCO_3$ (Mallinckrodt 87.03% magnesium carbonate) --- 50.0
- $TiO_2$ (reagent grade 99.9% titanium dioxide) 26.0
- $Li_2CO_3$ (reagent grade 99% lithium carbonate) --- 10.4

The calculated chemical composition of this glass is presented below.

Composition "III"

Component: Percent by weight
- $SiO_2$ --- 58.01
- $Al_2O_3$ --- 24.83
- $MgO$ --- 7.01
- $TiO_2$ --- 8.76
- $Li_2O$ --- 1.40

The mixing, melting, homogenizing and fiber forming techniques of Example I were followed in preparing the test fibers of Composition "III." Composition "III" fibers were found to exhibit a tensile strength of about 533,000 pounds per square inch for fibers measuring between $35.1 \times 10^{-5}$ inches and $39 \times 10^{-5}$ inches in diameter.

EXAMPLE IV

The following raw batch materials were weighed out in the amounts indicated to formulate Composition "IV."

Composition "IV" batch

Raw batch materials: Weight in grams
- $SiO_2$ (agate sand 99.78% silicon dioxide) -- 167.4
- $Al(OH)_3$ (reagent grade 99.8% aluminum hydroxide) --- 114.0
- $MgCO_3$ (Mallinckrodt 87.03% magnesium carbonate) --- 60.6
- $TiO_2$ (reagent grade 99.9% titanium dioxide) 26.1
- $Li_2CO_3$ (reagent grade 99% lithium carbonate) --- 7.0

The calculated chemical composition of this glass is presented below.

Composition "IV"

Component: Percent by weight
- $SiO_2$ --- 56.72
- $Al_2O_3$ --- 24.95
- $MgO$ --- 8.54
- $TiO_2$ --- 8.84
- $Li_2O$ --- .95

This glass composition exhibits properties very similar to Composition "II" of Example II.

EXAMPLE V

The following raw batch materials were weighed out in the amounts indicated to formulate Composition "V."

Composition "V" batch

Raw batch materials: Weight in grams
- $SiO_2$ (agate sand 99.78% silicon dioxide) -- 308.0
- $Al(OH)_3$ (reagent grade 99.8% aluminum hydroxide) -- 191.5
- $MgCO_3$ (Mallinckrodt 87.03% magnesium carbonate) -- 119.1
- $TiO_2$ (reagent grade 99.9% titanium dioxide) 18.7

The calculated chemical composition of this glass is presented below.

Composition "V"

Component: Percent by weight
- $SiO_2$ -- 61.60
- $Al_2O_3$ -- 24.74
- $MgO$ -- 9.91
- $TiO_2$ -- 3.74

The same mixing, melting, homogenizing and fiber forming techniques of Example I were used to prepare the test fibers of Composition "V." Composition "V" fibers were found to exhibit a tensile strength of about 530,000 pounds per square inch for fibers measuring between $39 \times 10^{-5}$ inches and $78 \times 10^{-5}$ inches in diameter.

EXAMPLE VI

Standard ring-type fiber glass plastic reinforced test specimens were prepared using strands of the "E," "A," "I" and "II" compositions. The plastic reinforcing resin used to prepare these ring-type test specimens was an epoxy resin with a methyl nadic anhydride cure.

The specimens were prepared in accordance with the Recommended Practice for Fabrication of Ring Test Specimens (ASTM designation D0000–64T). The fabrication technique consisted broadly of winding a plastic resin coated glass strand about a mandrel to form a ring. The coated strand was wound under a tension load of about 2 pounds. After the desired amount of coated strand had been wound, the specimen was removed from the mandrel and heat treated to cure the resin. The curing treatment consisted of heating the specimen for 16 hours at a temperature of 260° F. and post curing an additional 4 hours at a temperature of 360° F.

The cured test rings were then wet ground to size using a machinist's lathe and cutting tool to remove excess resin and glass fibers. The finished test rings had an inside diameter of $5.750 \pm .002$ inches, a height of .250−.000, +.005 inch and a thickness of $.125 \pm .003$ inch.

Each ring specimen was tested by placing the specimen about the outside of a two part split D-shaped testing fixture and then separating the two D-shaped halves of the fixture until the specimen failed. Each half of the D-shaped fixture was in contact with approximately half of the inside diameter of the specimen during the test. The specimens failed in tension at approximately the point where the D-halves of the fixture were initially in contact.

The load causing failure was measured and the tensile strength of each specimen calculated using the following formula:

$$S = W/2ht$$

where S equals the tensile strength in pounds per square inch, W equals the load at failure in pounds, $h$ equals the height of the specimen at the point of failure in inches and $t$ equals the thickness of the specimen at the point of failure in inches.

Table III below presents the results of testing these fiber glass-plastic reinforced test rings.

TABLE III

| Composition | Average ultimate glass stress in composite (p.s.i.) | Average percent glass volume in composite |
|---|---|---|
| "E" | 272,000 | 70 |
| "A" | 328,000 | 69.8 |
| "I" | 316,500 | 73 |
| "II" | 332,000 | 55 |

The high fiber strengths exhibited by the glasses of the present invention are believed attributable to the combination of a relatively high alumina content and a relatively small, but essential $TiO_2$ content. Normally glasses which contain high percentages of these two ingredients tend to develop devitrification problems during forming. Surprisingly, in the present invention no devitrification problems were noted in forming the glass fibers using the techniques disclosed.

Various other ingredients in addition to those already noted can be incorporated in the glass compositions of the present invention. Zinc oxide may be incorporated in amounts up to about 2 percent by weight to help stabilize and harden the surface of the glass fiber. Antimony oxide may also be added in amounts up to about 2 percent by weight to aid the fining characteristics and homogeneity of the glass.

The improved tensile strengths of the fiber glass compositions in the present invention permit the production of improved glass reinforced plastic articles by increasing the strength to weight ratio of such articles. Table IV presents the densities of the "E," "A," "I" and "II" glass compositions.

Table IV

| Composition: | Density in grams per cubic centimeter |
|---|---|
| "E" | 2.59 |
| "A" | 2.48 |
| "I" | 2.54 |
| "II" | 2.55 |

It is anticipated that the glass fibers of the present invention will find particular acceptance in the production of various types of aircraft equipment where high strength to weight ratios are important. These glasses are well suited for fabricating pressure bottles and tanks such as those presently used to store gases (oxygen) or to store liquids (hydraulics or de-icing fluids) on aircraft.

I claim:
1. A glass composition exhibiting high strength in fibrous form consisting in its essential ingredients, in percent by weight, of 8.7 percent $TiO_2$, 9.8 percent $MgO$, 24.6 percent $Al_2O_3$, and 56.9 percent $SiO_2$.
2. A glass composition exhibiting high strength in fibrous form consisting in its essential ingredients, in percent by weight, of .47 percent $Li_2O$, 8.81 percent $TiO_2$, 8.49 percent $MgO$, 24.84 percent $Al_2O_3$, and 57.39 percent $SiO_2$.

References Cited

UNITED STATES PATENTS

| | | | |
|---|---|---|---|
| 2,664,359 | 12/1953 | Dingledy | 106—52 |
| 3,189,471 | 6/1965 | Thomas | 106—52 |

TOBIAS E. LEVOW, Primary Examiner

R. D. EDMONDS, Assistant Examiner

U.S. Cl. X.R.

106—50